(12) United States Patent
Murata et al.

(10) Patent No.: US 6,571,924 B2
(45) Date of Patent: Jun. 3, 2003

(54) PULLEY UNIT

(75) Inventors: Nakato Murata, Nagoya (JP); Akihiro Mizutani, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/985,134

(22) Filed: Nov. 1, 2001

(65) Prior Publication Data

US 2002/0050431 A1 May 2, 2002

(30) Foreign Application Priority Data

Nov. 1, 2000 (JP) ........................................ 2000-334605

(51) Int. Cl.[7] ........................ F16D 41/066; F16D 55/36
(52) U.S. Cl. ...................................... 192/45; 192/110 B
(58) Field of Search .............................. 192/45, 110 B; 474/70

(56) References Cited

U.S. PATENT DOCUMENTS

| | | | | | |
|---|---|---|---|---|---|
| 2,663,397 | A | * | 12/1953 | Scott | 192/105 R |
| 4,346,857 | A | * | 8/1982 | Moll | 242/256 |
| 4,667,788 | A | * | 5/1987 | Johnston et al. | 192/45 |
| 5,827,143 | A | * | 10/1998 | Monahan et al. | 474/73 |
| 6,116,393 | A | | 9/2000 | Ooitsu et al. | |

FOREIGN PATENT DOCUMENTS

JP  8-166027 A  *  6/1996

* cited by examiner

Primary Examiner—Richard M. Lorence
(74) Attorney, Agent, or Firm—Oliff & Berridge, PLC

(57) ABSTRACT

A pulley unit capable of ensuring long-term operational stability in use as a one-way clutch is provided. A one-way clutch is disposed between a pulley and its concentric shaft. The one-way clutch exhibits a U-shaped inner ring that is integral with the pulley, a U-shaped outer ring integral with the shaft, and rollers accommodated within wedge-like spaces formed between the inner ring and the outer ring. A load from a belt is exerted not on the one-way clutch but mainly on a bearing disposed radially inside of the one-way clutch.

16 Claims, 4 Drawing Sheets

PULLEY UNIT

CROSS REFERENCE TO RELATED APPLICATION

This application is based on and incorporates herein by reference Japanese Patent Application No. 2000-334605 filed on Nov. 1, 2000.

BACKGROUND OF THE INVENTION

1. Field of the Invention

The present invention relates to a pulley unit provided with a one-way clutch.

2. Description of the Related Art

Various accessories installed on a vehicular engine are driven by a belt which receives its rotational energy from the engine's crankshaft. However, in the case of an alternating current (AC) generator used as an accessory connected in synchronous rotation to the crankshaft of the engine, a decrease in the number of revolutions of the crankshaft is normally experienced, which results in a diminished power generating capacity of the AC generator, during certain modes of the AC generator or its associated driving mechanism.

For avoiding the inconvenience of a reduction of rotational capacity, there is known a method wherein a pulley unit with a one-way clutch is used for the AC generator to improve the generating efficiency during periods of a decreased number of revolutions of the crankshaft.

FIG. 5 is a partial cross-sectional view of a conventional pulley unit incorporating a one-way clutch 120. The conventional pulley unit shown in FIG. 5 comprises a pulley 100 and a shaft 110 which are arranged concentrically and a one-way clutch 120 disposed in an axially intermediate position within a space formed between the pulley 100 and the shaft 110. The one-way clutch 120 comprises an outer ring 122 fixed to the pulley 100, an inner ring 124 fixed to the shaft 110, and a plurality of cylindrical rollers 126 sandwiched in between the outer ring 122 and the inner ring 124. FIG. 3, also a conventional pulley arrangement, shows that between the outer ring 122 and inner ring 124, there are formed wedge-like spaces in multiple positions in the circumferential direction, and the rollers 126 are disposed within those wedge-like spaces, whereby there is formed the one-way clutch 120 which can transfer a rotational driving force in only one direction.

With this pulley unit, a locked state (power transfer state) of the one-way clutch 120 and a free state (power transfer cut-off state) of the one-way clutch 120 are switched from one to the other in accordance with a difference in rotation between a rotor integral with the shaft 110 and the pulley 100. Thus, it is possible to transfer power between the pulley 100 and the rotor and cut off the transfer. Two bearings 130 are provided, respectively, at both axial ends of the one-way clutch 120 to ensure smooth, relative rotation between the pulley 100 and the rotor and lighten the load applied to the clutch from a belt.

In the above conventional pulley unit, when the pulley 100 is rotated by a belt which is secured in the channels of the outer periphery of the pulley 100, a radial load is exerted from the pulley 100 on the rollers 126 of the one-way clutch 120 and also on the bearings 130 disposed on both sides of the rollers. In such a state of use, a clearance allowance between the pulley 100 and the outer ring 122 of the one-way clutch 120 is increased by the radial load exerted from the belt, because the outer ring 122 of the one-way clutch 120 is apt to be distorted radially inwards. Consequently, the wedge-like spaces formed in plural positions in the circumferential direction of the one-way clutch 120 become smaller in radial size and the rollers 126 are displaced which cause the state of the clutch to change. With a decreasing radial size, the wedge angle of each wedge-like space is apt to become small. For example, if the wedge angle becomes smaller than a predetermined lower-limit value, the rollers 126 of the one-way clutch 120 are fixed in the locked state, with no change-over being made to the free state. Thus, the conventional pulley unit has the problem that long-term operational stability can not be achieved due to a deformation of the one-way clutch caused by the radial load from the belt.

Continuing with the conventional pulley unit, FIG. 3 provides a visual example of the outer ring 122 when it is distorted radially inward. Distortion occurs when the wedge angle of each wedge-like space changes from an angle θ1 in the absence of a distortion of the outer ring 122 to an angle θ2 in the presence of distortion of the outer ring 122. It follows that the number of revolutions at a change-over between a locked state and a free state will vary depending on the degree of distortion of the outer ring, thereby creating unstable pulley operation.

Moreover, in the above conventional pulley unit, since two bearings 130 are provided at both axial ends of the one-way clutch 120, the number of components used is large and the assembly performance is poor.

SUMMARY OF THE INVENTION

The present invention has been accomplished in view of the above-mentioned problems, therefore, it is an object of the present invention to provide a pulley unit which ensures long-term operational stability even with the use of a one-way clutch. It is another object of the present invention to provide a pulley unit with a reduced number of components to thereby attain a reduction in part cost and improvement in assembly performance.

For solving the above-mentioned problems, the pulley unit of the present invention is provided with a one-way clutch between a pulley and a shaft which are concentrically disposed. The one-way clutch comprises an inner ring formed integrally with the pulley, an outer ring formed integrally with the shaft, and rollers accommodated within wedge-like spaces formed between the inner ring and the outer ring. Since the inner ring of the one-way clutch and the pulley are integral with each other, a radial load from the pulley is not transferred to the outer ring and the rollers which are disposed radially outside of the inner ring. This prevents distortion of the outer ring. Consequently, the shape of the wedge-like spaces can be held constant and it is also possible to essentially hold constant the number of revolutions of the pulley, which accommodates transitioning between the locked state and the free state (and vice versa) with movement of the rollers, thus making it possible to ensure long-term operational stability of the pulley. Moreover, since the radial load from the pulley is not imposed on the rollers, it is possible to reduce the roller diameter and it becomes possible to reduce the size of the entire pulley unit.

It is preferable that the pulley and the inner ring be U-shaped and that the one-way clutch be disposed in an annular space inside the pulley. By forming the pulley and the inner ring integrally in a U shape, an interior annular U-shaped space necessary for disposing the one-way clutch is created.

Continuing, it is preferable that two bearings be disposed radially inside of the one-way clutch to receive a load from the pulley. Thus, a load from the pulley can be received directly by the outer ring and the inner ring, which is integral with the pulley, without going through the rollers, etc. in the one-way clutch. In this way the load can be transferred to the shaft by disposing one bearing radially inside of the inner ring and one between the pulley and the outer ring. This positioning in the bearings makes it possible to improve the assembly performance.

It is preferable that clutch cam portions which form the wedge-like spaces have rounded cam surfaces. An inner peripheral surface of the outer ring and/or an outer peripheral surface of the inner ring, opposed to the clutch cam portions, are/is a curved surface and therefore, by forming the clutch cam portions so as to have rounded surfaces, the radial width of each wedge-like space can be changed gently in connection with movement of the rollers in the circumferential direction and it is possible to realize a firmly locked state when the rollers have moved to a particular position.

It is preferable that a retaining piece for holding the rollers not be used. By accommodating the rollers within the wedge-like spaces without the use of a retainer, the number of components used can further be reduced and it becomes possible to attain a further reduction of cost and a further improvement of the assembly performance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF PREFERRED EMBODIMENT

A pulley unit according to an embodiment of the present invention will be described in detail with reference to the accompanying drawings.

Figure 1:
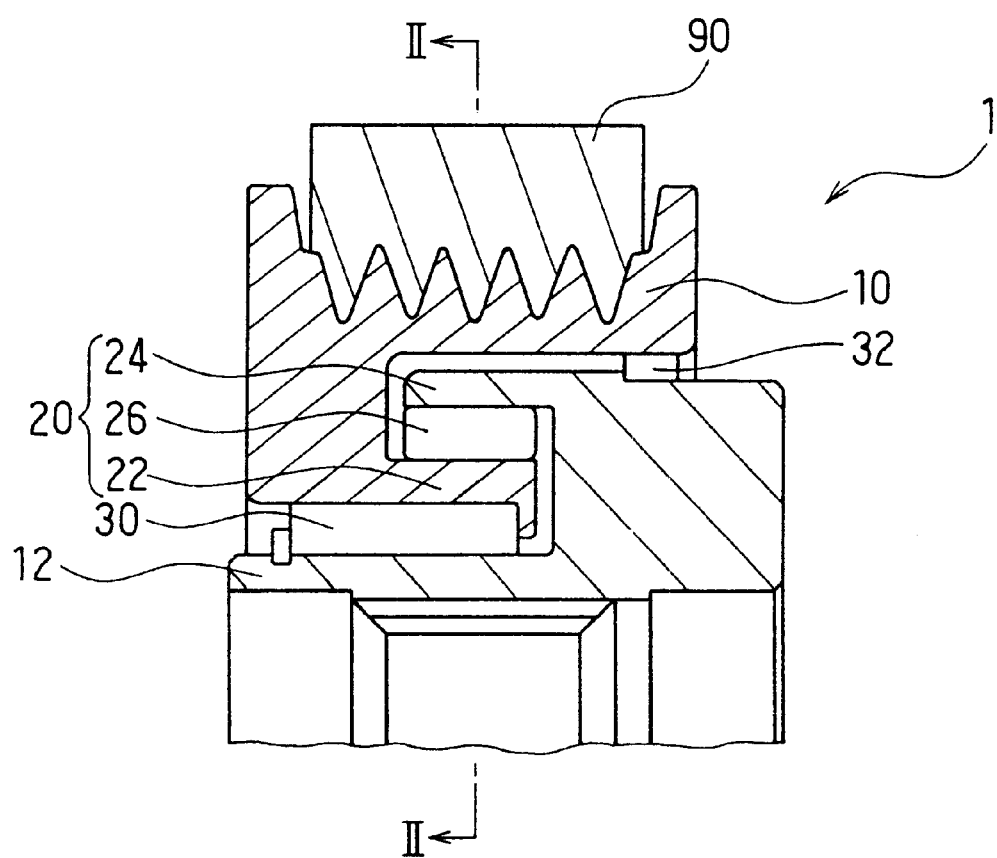
FIG. 1 is an axial cross-sectional view of a pulley unit according to an embodiment of the present invention.
Figure 2:
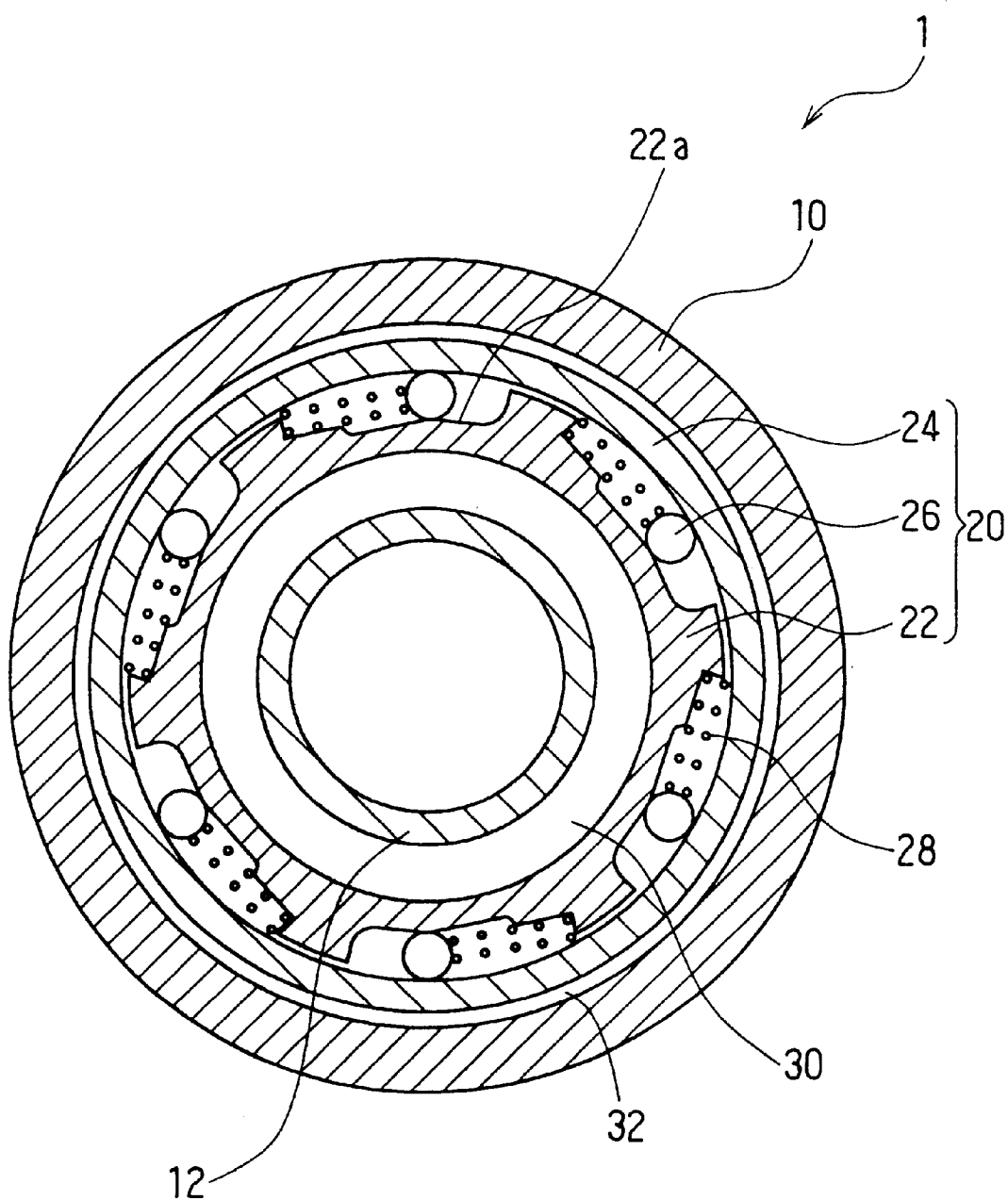
FIG. 2 is a cross-sectional view taken along line II—II in FIG. 1.

FIG. 1 is an axial cross-sectional view of a pulley unit according to an embodiment of the present invention, and FIG. 2 is a cross-sectional view taken along line II—II of FIG. 1.

As shown in both figures, the pulley unit 1 is provided with a pulley 10 and a shaft 12 which are concentrically disposed. A one-way clutch 20 is disposed in an annular space between the pulley 10 and the shaft 12, a bearing 30 is disposed radially inside of the one-way clutch 20 within the annular space, and bearing 32 is optionally disposed between pulley 10 and outer ring 24.

Formed in an outer periphery of the pulley 10 is a series of grooves or channels for securing a belt 90. The pulley 10 is rotably driven by the belt 90 by means of a crankshaft of an automobile engine, for example. The shaft 12 is comprised of a cylindrical member and is fixed to an input shaft of an accessory in the automobile (e.g., a rotor of a vehicle's AC generator).

With reference to FIG. 2, the one-way clutch 20 comprises an inner ring 22 having cam surfaces 22a, the cam surfaces 22a being formed in multiple circumferential positions of an outer periphery of the inner ring 22 and each having a curved (rounded) surface. Additionally, the one-way clutch 20 comprises an outer ring 24 (disposed along the outer periphery of the inner ring 22), rollers 26 accommodated one by one within pocket portions surrounded by the cam surfaces 22a of the inner ring 22 and an inner peripheral surface of the outer ring 24, and coil springs 28 having a generally rectangular section and urging the rollers, respectively, in one circumferential direction (clockwise in FIG. 2).

The inner ring 22 is formed integrally with the pulley 10. An outer peripheral side of a member having a generally U-shaped axial section is used as the pulley 10 and an inner peripheral side thereof is used as the inner ring 22 of the one-way clutch 20. The outer ring 24 is formed integrally with the shaft 12. An inner peripheral side of a member having a generally U-shaped axial section is used as the shaft 12 and an outer peripheral side thereof is used as the outer ring 24 of the one-way clutch 20.

The pocket portions which accommodate the rollers 26 each form a clutch cam portion having a wedge-like space. The wedge-like space gradually narrows in radial width in the circumferential direction. Each roller 26 is urged to a narrower side (locking side) of the wedge-like space by its associated coil spring 28. The pulley unit 1 of this embodiment has such a structure. Now, the operation of the pulley unit 1, in particular situations, will be described below.

(1) In the case where the rotational speed of the pulley 10 is relatively higher than that of the shaft 12:

When the rotational speed of the pulley 10 becomes relatively higher than that of the shaft 12, the rollers 26 of the one-way clutch 20 move to the narrower passage within the wedge-like spaces. Consequently, the rollers 26 are pinched between the cam surface 22a and the inner peripheral surface of the outer ring 24, thus creating a locked state in which the inner ring 22 and the outer ring 24 rotate integrally with each other. Consequently, the pulley 10 and the shaft 12 become united and rotate synchronously.

(2) In the case where the rotational speed of the pulley 10 is relatively lower than that of the shaft 12:

When the rotational speed of the pulley 10 becomes relatively lower than that of the shaft 12, the rollers 26 of the one-way clutch 20 move to the wider passage within the wedge-like spaces. Consequently, the rollers 26 are released from their pinched state between the cam surfaces 22a and the inner peripheral surface of the outer ring 24 while the inner ring 22 and outer ring 24 assume a free state in which they can rotate separately. As a result, the transfer of rotational power from the pulley 10 to the shaft 12 is cut off and only the shaft 12 keeps rotating by virtue of its rotational inertial force.

In the case where the pulley unit 1 described above is utilized in a vehicular AC generator, the generation efficiency can be improved by keeping the rotor revolution high regardless of a change in revolution of the engine crankshaft which is connected to the pulley unit 1 through the belt 90. More specifically, when the number of revolutions of the crankshaft increases, the one-way clutch 20 is locked, so that the shaft 12 rotates synchronously with the pulley 10. On the other hand, when the number of revolutions of the crankshaft decreases, the one-way clutch 20 becomes free, so that the number of revolutions of the shaft 12 can be maintained by virtue of the rotational inertial force of the rotor, irrespective of the number of revolutions of the decelerating pulley 10.

In such a mode of utilization, the tension of the belt 90 is applied constantly to the pulley unit 1, so that a radial load is constantly imposed on the pulley 10. However, since the pulley 10 is formed by using a member whose axial section is generally U-shaped and the inner ring 22 of the one-way clutch 20 is integrally formed by utilizing the inner peripheral side of the U-shaped member, a radial load from the belt 90 is exerted not on the one-way clutch 20, but primarily on the bearing 30 which is disposed radially inside of the one-way clutch 20. Optionally, bearing 32 is provided between the pulley 10 and the outer ring 24. Therefore, the outer ring 24 of the one-way clutch 20 is not distorted on the inner peripheral side toward the wedge-like spaces, but the wedge angle of the wedge-like spaces is maintained constant. As a result, it becomes possible to guarantee functional stability of the one-way clutch 20 for stabilizing the behaviors of both, a locked state and a free state of the rollers 26 in the one-way clutch 20 and for stabilizing the number of revolutions at which a transition between those two states occurs.

Figure 3:
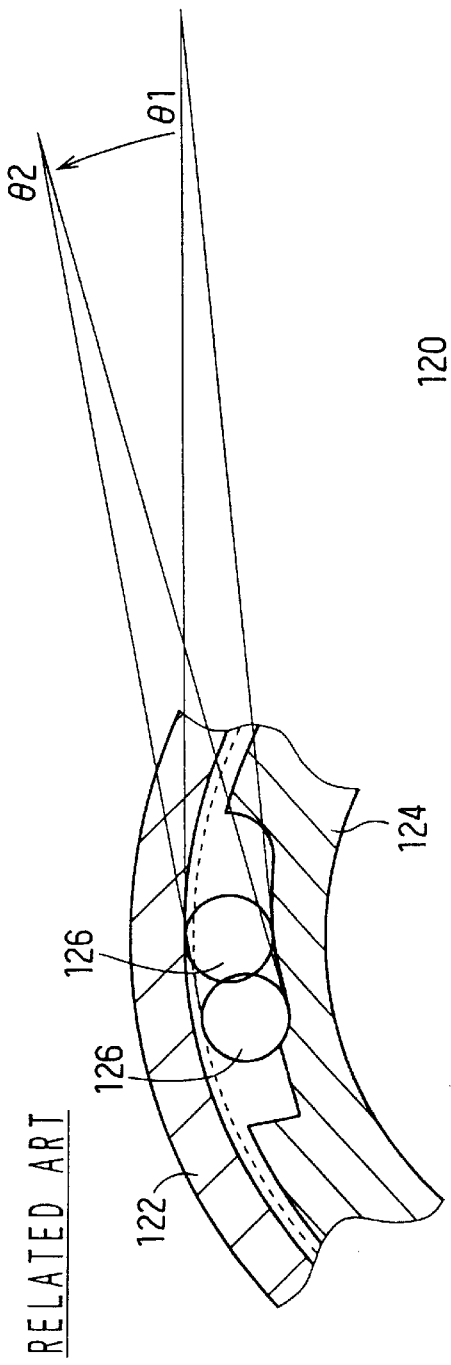
FIG. 3 is a related art, partial cross-sectional view of a conventional pulley unit illustrating how a wedge angle changes with distortion of an outer ring.

On the other hand, in the conventional pulley unit wherein the outer ring is distorted radially inwards, as shown in FIG. 3, the wedge angle of each wedge-like space changes from an angle θ1 in the absence of a distortion of the outer ring to an angle θ2 in the presence of a distortion of the outer ring, thus precipitating a move to the narrower area. It follows that the number of revolutions at the change-over between the locked state and free state will vary depending on the degree of distortion of the outer ring, thereby creating unstable operation.

Figure 5:
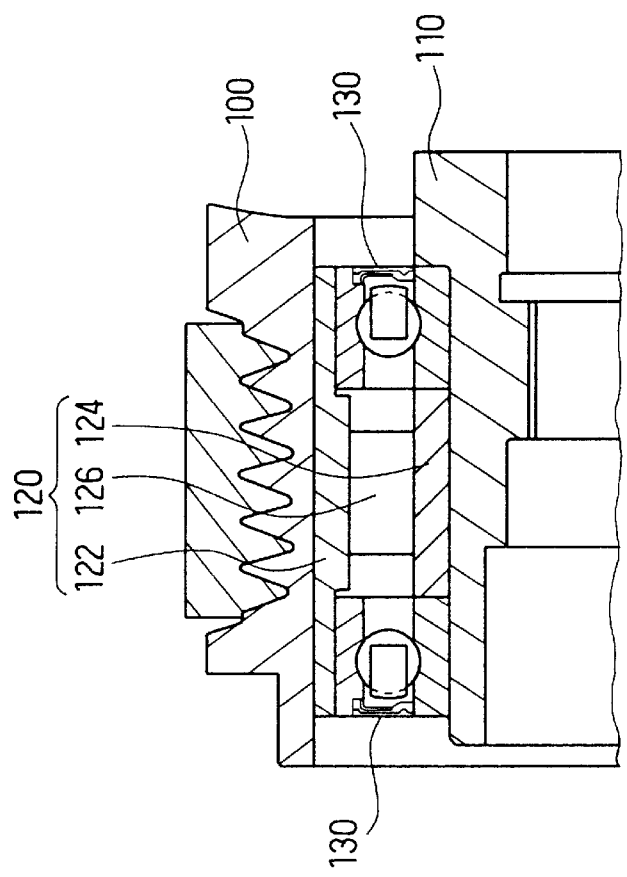
FIG. 5 is a related art, partial cross-sectional view of a conventional pulley unit incorporating a one-way clutch.

Moreover, in the pulley unit 1 of this embodiment, only one radial bearing 30 must be used inside of the one-way clutch 20, so that the number of bearings can be reduced in comparison with the conventional, related art, pulley unit of FIG. 5. With such a reduction in the number of components used in making the part, a reduction of cost and an improvement of assembly performance is possible. Alternatively, bearing 32 may additionally be used thus providing additional support between the pulley 10 and the outer ring 24 in the event the applied loading necessitates such a bearing as bearing 32.

The present invention is not limited to the above embodiment, but various modifications may be made within the gist of the present invention. For example, although in the above embodiment pocket portions are formed in the outer peripheral surface of the inner ring 22 which constitutes the one-way clutch 20, the pocket portions may be formed in the inner peripheral surface of the outer ring 24.

Figure 4:
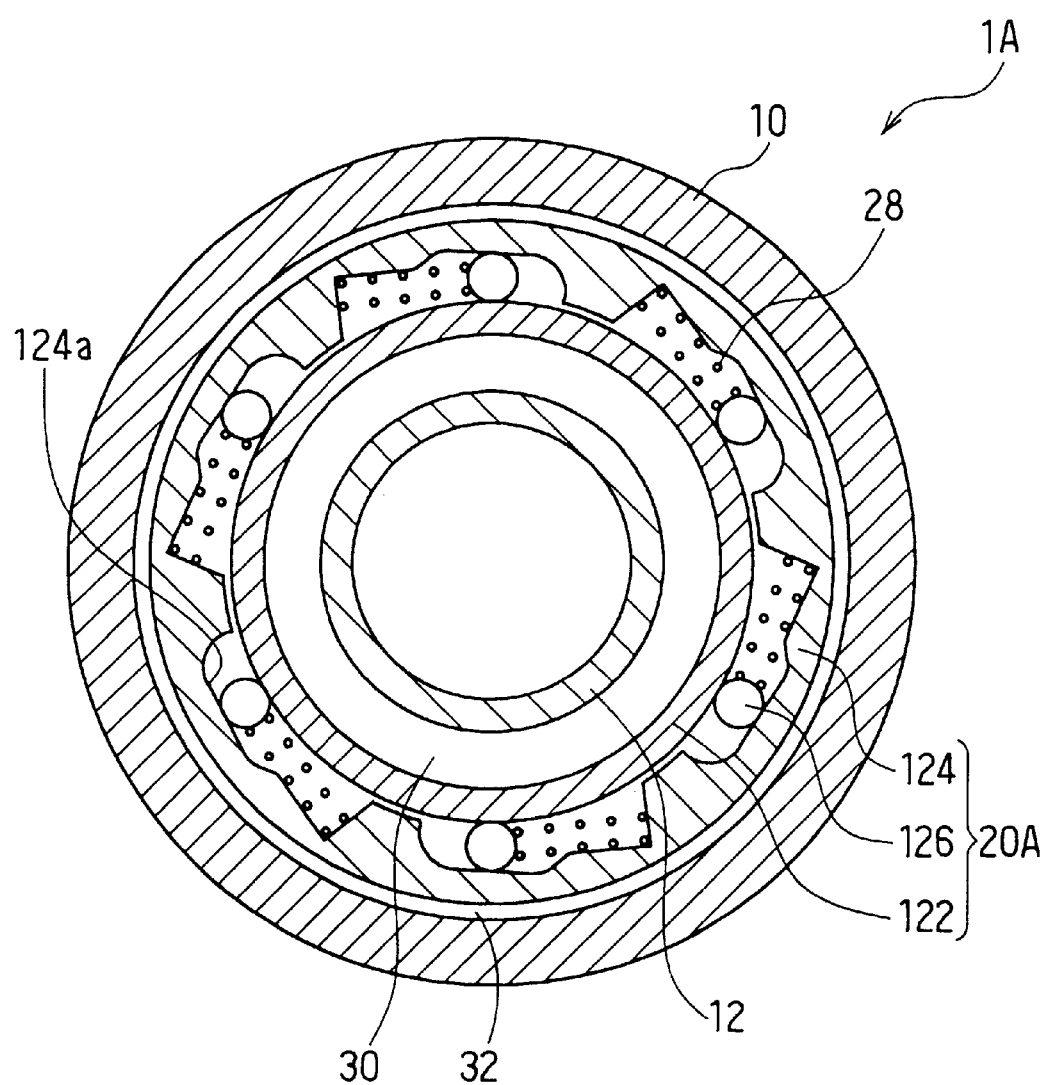
FIG. 4 is a cross-sectional view of a pulley unit, according to an embodiment of the present invention, with rollers accommodated in pocket portions formed in an inner peripheral surface of an outer ring.

FIG. 4 is a cross-sectional view of a pulley unit 1A, of the present invention, wherein rollers are accommodated within pocket portions which are formed in an inner peripheral surface of an outer ring 124. The pulley unit 1A, shown in FIG. 4, comprises a pulley 10 and a shaft 12 both disposed concentrically, as well as a one-way clutch 20A disposed in an annular space formed between the pulley 10 and the shaft 12, and a bearing 30 disposed radially inside of the one-way clutch 20A within the annular space. This pulley unit 1A is different from the pulley unit 1 shown in FIGS. 1 and 2 in that the one-way clutch 20 is replaced with the one-way clutch 20A. Optional bearing 32 is also shown.

The one-way clutch 20A comprises an outer ring 124 having rounded cam surfaces 124a at multiple circumferential positions of an inner peripheral surface thereof, an inner ring 122 disposed along the inner periphery of the outer ring 124, multiple rollers 126 accommodated one by one within pocket portions surrounded with the cam surfaces 124a formed in the outer ring and an outer peripheral surface of the inner ring 122, and coil springs 28 which urge the rollers 126 in one circumferential direction.

Thus, by forming pocket portions in the inner peripheral surface of the outer ring 124, even if there are wedge-like spaces for receiving the rollers 126, a radial load from the belt is exerted not on the one-way clutch 20A but primarily on the bearing 30 radially disposed inside of the one-way clutch 20A and optionally on bearing 32 if the device is so equipped. Accordingly, there is no fear of the outer ring 124 of the one-way clutch 20A becoming distorted on the inner peripheral side facing the wedge-like spaces. Consequently, the wedge angle of each wedge-like space is kept constant.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pulley unit having a one-way clutch disposed between a pulley and a shaft, the pulley and the shaft being disposed concentrically,
   the one-way clutch comprising an inner ring formed integrally with the pulley, an outer ring formed integrally with the shaft, the inner ring and the outer ring forming wedge-like spaces, and rollers accommodated within the wedge-like spaces, wherein the pulley and the inner ring are U-shaped in axial section and the one-way clutch is disposed in an annular space formed inside the pulley.

2. A pulley unit according to claim 1, wherein a pulley load is received by a single bearing disposed radially inside of the one-way clutch.

3. A pulley unit according to claim 2, wherein the wedge-like spaces are each formed by a clutch cam portion having a rounded cam surface.

4. A pulley unit according to claim 2, wherein the clutch cam portion is formed in the inner ring.

5. A pulley unit according to claim 2, wherein the clutch cam portion is formed in the outer ring.

6. A pulley unit according to claim 5, not having a retainer for holding the rollers.

7. A pulley unit having a one-way clutch disposed between a pulley and a shaft, the pulley and the shaft being disposed concentrically,
   the one-way clutch comprising an inner ring formed integrally with the pulley, an outer ring formed integrally with the shaft, the inner ring and the outer ring forming a plurality of spaces formed between the pulley and the shaft, and a plurality of rollers accommodated within the spaces, and
   a plurality of springs, each spring biasing a roller in order to activate the one-way clutch.

8. The pulley unit of claim 7, further comprising a plurality of cam portions within the plurality of spaces, each cam portion having an angular surface, relative to a radial line from a center of the shaft, each roller being biased along the cam portion to cause interference with a surface opposite the cam portion, thereby causing rotation of the adjacent structure.

9. The pulley unit of claim 8, wherein the plurality of spaces are formed in an outer peripheral surface of the inner ring, each roller within the space being confined by the cam portion, the spring, and the outer ring.

10. The pulley unit of claim 8, wherein the plurality of spaces are formed in an inner peripheral surface of the outer ring, each roller within the space being confined by the cam portion, the spring, and the inner ring.

11. The pulley unit of claim 9, wherein the inner ring interfaces with a bearing which interfaces with the shaft thereby facilitating rotation of the pulley unit around the shaft.

12. A pulley unit having a one-way clutch disposed between a pulley and a shaft, the pulley and the shaft being disposed concentrically, the one-way clutch comprising an integrally formed inner ring and pulley, U-shaped in axial section, an integrally formed outer ring and shaft, U-shaped in axial section, the outer ring and the inner ring forming a wedge-like space in which a one-way clutch is disposed, a bearing disposed between the inner ring and shaft, thereby permitting the pulley and inner ring to rotate relative to the outer ring and shaft, the inner ring and the outer ring forming a plurality of wedge-like spaces, and a plurality of rollers accommodated within the wedge-like spaces.

13. The pulley unit of claim 12 further comprising, a cam portion having a rounded cam surface, wherein the cam portion is located within a wedge-like space.

14. The pulley unit of claim 13, wherein the plurality of spaces are formed in an outer peripheral surface of the inner ring, the spaces being defined by the cam portion, a spring, and the outer ring, and wherein a radial distance between the cam surface and an inner surface of the outer ring decreases in the biasing direction of the spring in order to secure the roller between the cam surface and the inner surface of the outer ring when the one-way clutch is in a locked position.

15. The pulley unit of claim 13, wherein the plurality of spaces are formed in an inner peripheral surface of the outer ring, the spaces being defined by the cam portion, a spring, and the inner ring, and wherein a radial distance between the cam surface and an outer surface of the inner ring decreases in the biasing direction of the spring to secure the roller between the cam surface and the outer surface of the inner ring when the one-way clutch is in a locked position.

16. The pulley unit of claim 12 further comprising, a bearing located between the pulley and the outer ring, the bearing providing additional support for the pulley.

* * * * *